United States Patent
Mizushima et al.

(10) Patent No.: US 12,314,399 B2
(45) Date of Patent: May 27, 2025

(54) SECURITY RISK ANALYSIS ASSISTANCE DEVICE, METHOD, AND COMPUTER-READABLE MEDIUM

(71) Applicant: NEC Corporation, Tokyo (JP)

(72) Inventors: Ryo Mizushima, Tokyo (JP); Hirofumi Ueda, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 307 days.

(21) Appl. No.: 17/762,491

(22) PCT Filed: Sep. 27, 2019

(86) PCT No.: PCT/JP2019/038107
§ 371 (c)(1),
(2) Date: Mar. 22, 2022

(87) PCT Pub. No.: WO2021/059471
PCT Pub. Date: Apr. 1, 2021

(65) Prior Publication Data
US 2022/0342999 A1 Oct. 27, 2022

(51) Int. Cl.
G06F 21/57 (2013.01)
(52) U.S. Cl.
CPC ...... *G06F 21/577* (2013.01); *G06F 2221/034* (2013.01)
(58) Field of Classification Search
None
See application file for complete search history.

(56) References Cited

U.S. PATENT DOCUMENTS

2002/0147803 A1* 10/2002 Dodd .................. H04L 63/1433
726/25
2005/0193430 A1* 9/2005 Cohen ................. H04L 63/1433
726/25
(Continued)

FOREIGN PATENT DOCUMENTS

CN 102170431 A 8/2011
JP 2011-028613 A 2/2011
(Continued)

OTHER PUBLICATIONS

International Search Report for PCT Application No. PCT/JP2019/038107, mailed on Dec. 10, 2019.
(Continued)

*Primary Examiner* — Fatoumata Traore

(57) ABSTRACT

Attack path information includes information about an attack path including at least one attack step including an attack source, an attack destination, and an attack method. Vulnerability specification means refers to the attack path information and thereby specifies vulnerabilities exploitable by an attack on the attack destination in the attack step. In the vulnerability information DB, vulnerabilities and presence/absence of exploit codes for the vulnerabilities are stored and associated with each other. Diagnosis evaluation generation means refers to the vulnerability information DB, and thereby examines whether or not there is an exploit code for the specified vulnerability and generates, for the attack step, a risk diagnosis evaluation including the number of specified vulnerabilities and the presence/absence of the exploit codes therefor. Output means outputs the attack step and the risk diagnosis evaluation while associating them with each other.

13 Claims, 12 Drawing Sheets

| ATTACK SOURCE | ATTACK DESTINATION | ATTACK METHOD | VULNERABILITY |
|---|---|---|---|
| HOST A | HOST B | CODE EXECUTION 1 | CVE-XXXX-0111 |
| | | | CVE-XXXX-0112 |
| HOST B | HOST C | DATA TAMPERING 1 | CVE-XXXX-0111 |
| ⋮ | ⋮ | ⋮ | ⋮ |

(56) References Cited

U.S. PATENT DOCUMENTS

| | | | | |
|---|---|---|---|---|
| 2006/0218640 | A1* | 9/2006 | Lotem | G06F 21/577 |
| | | | | 726/25 |
| 2008/0005555 | A1* | 1/2008 | Lotem | G06F 21/55 |
| | | | | 713/150 |
| 2010/0257610 | A1* | 10/2010 | Hohl | G06F 21/52 |
| | | | | 726/25 |
| 2011/0191854 | A1* | 8/2011 | Giakouminakis | H04L 63/1433 |
| | | | | 726/25 |

FOREIGN PATENT DOCUMENTS

| | | |
|---|---|---|
| JP | 2016-192176 A | 11/2016 |
| JP | 2017-224053 A | 12/2017 |
| JP | 2018-077597 A | 5/2018 |

OTHER PUBLICATIONS

"Security Risk Assessment Guide for Industrial Control Systems, Second Edition", Security Center of Information-technology Promotion Agency, Japan, Oct. 2018, URL: <https://www.ipa.go.jp/security/controlsystem/riskanalysis.html>, pp. 1-380.

NEC, "Technology for Automatic Cyber Attack Risk Assessment", NEC Featured Technologies, Nov. 5, 2018, URL: <https://jpn.nec.com/rd/technologies/201804/index.html>, pp. 1-4.

Harada Toshiki et al., "The Development of the Vulnerability Information Provision Web API 'AVIP'", The 2009 Symposium on Cryptography and Information Security (SCIS 2009), Jan. 20, 2009, pp. 1-6.

JP Office Action for JP Application No. 2021-548109, mailed on May 16, 2023 with English Translation.

Shogo Shimizu, "The guide to an information security for an engineer, the 7th time", the monthly automatic recognition, Japan Industrial Publishing Co., Ltd., vol. 25, No. 1, pp. 63-68, Jan. 10, 2012.

\* cited by examiner

| ATTACK METHOD | VULNERABILITY |
|---|---|
| CODE EXECUTION 1 | CVE-XXXX-0111 |
| | CVE-XXXX-0112 |
| | CVE-XXXX-0150 |
| | CVE-XXXX-0200 |
| DATA TAMPERING 1 | CVE-XXXX-0111 |
| ⋮ | ⋮ |

| ATTACK SOURCE | ATTACK DESTINATION | ATTACK METHOD | VULNERABILITY |
|---|---|---|---|
| HOST A | HOST B | CODE EXECUTION 1 | CVE-XXXX-0111 |
| | | | CVE-XXXX-0112 |
| HOST B | HOST C | DATA TAMPERING 1 | CVE-XXXX-0111 |
| ⋮ | ⋮ | ⋮ | ⋮ |

ATTACK SCENARIO

| ITEM NUMBER | ATTACK ROUTE/ATTACK STEP | | | | RISK DIAGNOSIS EVALUATION | | | EVALUATION INDEX | | |
|---|---|---|---|---|---|---|---|---|---|---|
| | ATTACK OUTLINE | | | | NUMBER OF VULNER-ABILITIES | ATTACK CODE | TREAT LEVEL | VULNER-ABILITY LEVEL | BUSINESS RISK LEVEL | RISK VALUE |
| 1 | ENTRY POINT: PC; ATTACK TARGET: HOST A; FINAL ATTACK: DoS ATTACK. ATTACK OUTLINE: An attacker has an impact on a target system by making an attack from a pc and making a DoS attack in a host A. | | | | | | | | | |
| 2 | ATTACK OUTLINE: There is a possibility that a malignant file could be placed in a certain path on a host, which is an attack target, and a vulnerability through which data can be tampered is exploited as the program opens the file, so that data could be tampered in a path that can be accessed with the authorization of the program. | ATTACK SOURCE: PC; ATTACK DESTINATION: HOST A; ATTACK MEANS: DATA TAMPERING; ATTACK METHOD: DATA TAMPERING 2 | | | 9 | 2 | 3 | 3 | 3 | 5 |
| 3 | ATTACK OUTLINE: There is a possibility that, for a host, which is an attack target, a malignant file could be placed in a path that can be accessed with the authorization of an administrator, and as a user mistakenly opens the file, the code could be executed with the authorization. | ATTACK SOURCE: HOST A; ATTACK DESTINATION: HOST A; ATTACK MEANS: CODE EXECUTION; ATTACK METHOD: CODE EXECUTION 2 | | | 0 | 0 | 1 | 3 | 3 | 4 |
| 4 | ATTACK OUTLINE: There is a possibility that a DoS attack could be made for a host that can be logged in. | ATTACK SOURCE: HOST A; ATTACK DESTINATION: HOST A; ATTACK MEANS: DoS ATTACK; ATTACK METHOD: DoS ATTACK 1 | | | 0 | 0 | 1 | 3 | 3 | 4 |
| 5 | ATTACK OUTLINE: There is a possibility that a DoS attack could be made by exploiting a vulnerability through which a DoS attack can be made on a program on a host, which is an attack target. | ATTACK SOURCE: PC; ATTACK DESTINATION: HOST A; ATTACK MEANS: DoS ATTACK; ATTACK METHOD: DoS ATTACK 2 | | | 2 | 0 | 1 | 3 | 2 | 4 |

| ATTACK SOURCE | ATTACK DESTINATION | ATTACK METHOD | VULNERABILITY | INDIVIDUAL DETAILED INFORMATION |
|---|---|---|---|---|
| PC | HOST A | DATA TAMPERING 2 | CVE-XXXX-0111 | http://....... |
| | | | CVE-XXXX-0222 | http://....... |
| | | | | https://....... |
| | | | CVE-XXXX-0333 | http://....... |
| | | | | https://....... |
| | | | | https://....... |
| | | | ⋮ | ⋮ |

Fig. 9

| RISK DIAGNOSIS EVALUATION (SOFTWARE) | | RISK DIAGNOSIS EVALUATION (PROTOCOL) | | | |
|---|---|---|---|---|---|
| NUMBER OF VULNERABILITIES | EXPLOIT CODE | ENCRYPTION | LOGIN | FILE TRANSFER | ACCOUNT STEALING |
| 9 | 2 | - | - | - | - |
| 0 | 0 | YES | NO | YES | NO |
| ⋮ | ⋮ | ⋮ | ⋮ | ⋮ | ⋮ |

| RISK DIAGNOSIS EVALUATION | | | |
|---|---|---|---|
| NUMBER OF VULNERABILITIES | EXPLOIT CODE | USER INVOLVEMENT | NUMBER OF APPEARANCES OF SCENARIOS |
| 9 | 2 | NO | 21 |
| 0 | 0 | YES | 4 |
| 0 | 0 | NO | 1 |
| ⋮ | ⋮ | ⋮ | ⋮ |

Fig. 13

SECURITY RISK ANALYSIS ASSISTANCE DEVICE, METHOD, AND COMPUTER-READABLE MEDIUM

This application is a National Stage Entry of PCT/JP2019/038107 filed on Sep. 27, 2019, the contents of all of which are incorporated herein by reference, in their entirety.

TECHNICAL FIELD

The present disclosure relates to a security risk analysis support apparatus, a method, and a computer-readable medium.

BACKGROUND ART

In recent years, threats of cyber-attacks have not been limited to the fields of ICT (Information and Communication Technology), and damages have also been occurring in the fields of control systems and IoT (Internet of Things). In the case of control systems, in particular, there have been cases where the operation of a critical infrastructure has been jeopardized, such as a case where a power system or a factory is shut down. To cope with such threats of cyber-attacks, it is important to clarify security risks present in a system, implement countermeasures thereagainst, and thereby reduce the risks.

In relation to the above-described matters, Patent Literature 1 discloses a technique for supporting planning of security measures in the security design of a large-scale system. In a security measure planning support apparatus disclosed in Patent Literature 1, system configuration information, network configuration information, risk analysis results, etc. are input. The risk analysis results are data in which a result of an analysis of a risk in each threat item is recorded. The risk analysis results include threat items, attack paths, attackers, threat events, attack methods, and risk values. The risk value indicates the degree of damage that an attack in the threat item inflicts on the system.

The security measure planning support apparatus extracts, for a threat item whose risk value exceeds a threshold value, components included in an attack path from the system configuration information and the network configuration information. The security measure planning apparatus records, for each threat item, information about the extracted components included in the attack path in the form of an attack path table. The security measure planning apparatus makes a list of possible security measures by referring to the attack path table, the risk analysis results, and a threat-to-countermeasure database, and records the list as a countermeasure list.

It should be noted that, in Non-patent Literature 1 published by Security Center of Information-technology Promotion Agency, Japan, a risk value is determined based on a threat level, a vulnerability level, and a business risk level.

Regarding the threat level, in the case of "an attack made by an individual attacker (irrespective of its skill), when the possibility of the attack succeeding is high", an evaluation score is "3". Further, in the case of "an attack made by an attacker having a certain level of skill, when there is a possibility of the attack succeeding", the evaluation score is "2". In the case of "an attack made by a national-level cyber attacker (an army or an organization comparable thereto), when there is a possibility of the attack succeeding", the evaluation score is "1".

CITATION LIST

Patent Literature

Patent Literature 1: Japanese Unexamined Patent Application Publication No. 2018-77597

Non Patent Literature

Non-patent Literature 1: "Security Risk Assessment Guide for Industrial Control Systems, Second Edition", Security Center of Information-technology Promotion Agency, Japan, https://www.ipa.go.jp/security/controlsystem/riskanalysis.html, October 2018

SUMMARY OF INVENTION

Technical Problem

Although Patent Literature 1 discloses how to use the results of risk analyses, it does not disclose how to carry out the risk analyses. For example, in the case of evaluating a risk when unauthorized access is made from a certain attack source to an attack destination, there is no objective index for determining an evaluation value of a threat level. Therefore, a person who performs a risk analysis may not be able to determine, for each threat item, whether the evaluation value of a threat level should be "3" or should be "2". Similarly, in Non-patent Literature 1, no objective index for determining the evaluation value of a threat level is presented.

In view of the above-described circumstances, an object of the present disclosure is to provide a security risk analysis support apparatus, a method, and a computer readable medium capable of presenting an objective index to a user when evaluating a risk.

Solution to Problem

To achieve the above-described object, the present disclosure provides a security risk analysis support apparatus including: vulnerability specification means for referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target; diagnosis evaluation generation means for referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and output means for outputting the attack step and the risk diagnosis evaluation while associating them with each other.

The present disclosure provides a security risk analysis support method including: referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target; referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and outputting the attack step and the risk diagnosis evaluation while associating them with each other.

The present disclosure provides a non-transitory computer readable medium storing a program for causing a computer to perform processes including: referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target; referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and outputting the attack step and the risk diagnosis evaluation while associating them with each other.

Advantageous Effects of Invention

The security risk analysis support apparatus, the method, and the computer-readable medium according to the present disclosure can present an objective index to a user when evaluating a risk.

BRIEF DESCRIPTION OF DRAWINGS

FIG. 5 shows an example of information stored in an attack outline DB;

FIG. 7 shows an example of displayed risk diagnosis evaluations;

FIG. 9 shows an example of a list of vulnerabilities;

FIG. 13 is a diagram for explaining a specific example of risk diagnosis evaluations according to a modified example.

DESCRIPTION OF EMBODIMENTS

Figure 1:
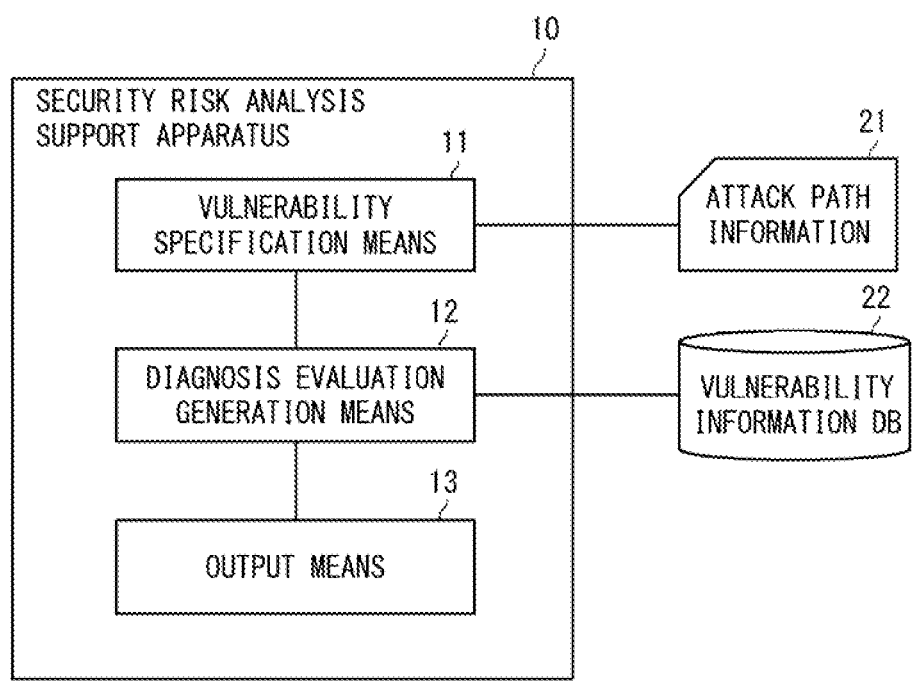
FIG. 1 is a block diagram schematically showing a security risk analysis support apparatus according to the present disclosure.

Prior to the description of an example embodiment according to the present disclosure, an outline of the present disclosure will be described. FIG. 1 schematically shows a security risk analysis support apparatus according to the present disclosure. The security risk analysis support apparatus 10 includes vulnerability specification means 11, diagnosis evaluation generation means 12, and output means 13. The security risk analysis support apparatus 10 assists a user to evaluate a risk by using attack path information 21 and information stored in a vulnerability information database (DB: database) 22.

The attack path information 21 includes information about an attack path indicating a path from an entry point included in a system to be analyzed to an attack target. The attack path includes at least one attack step including an attack source (i.e., an entity or the like which makes an attack), an attack destination (i.e., an entity or the like on which the attack is made), and an attack method. The vulnerability specification means 11 refers to the attack path information 21 and thereby specifies, for the attack step included in the attack path, vulnerabilities exploitable by an attack on the attack destination in the attack step.

In the vulnerability information DB 24, vulnerabilities and presence/absence of exploit codes for the vulnerabilities are stored and associated with each other. The diagnosis evaluation generation means 12 refers to the vulnerability information DB 24, and thereby examines whether or not there are exploit codes for the vulnerabilities specified by the vulnerability specification means 11 and generates, for the attack step, a risk diagnosis evaluation including the number of specified vulnerabilities and the presence/absence of the exploit codes therefor. The output means 13 outputs the attack step and the risk diagnosis evaluation while associating them with each other.

In the present disclosure, the vulnerability specification means 11 specifies, for an attack step included in the attack path, vulnerabilities that can be exploited by an attack on the attack destination. The diagnosis evaluation generation means 12 generates a risk diagnosis evaluation including the number of specified vulnerabilities and the presence/absence of exploit codes for the specified vulnerabilities. The risk diagnosis evaluation can be used as an objective index for evaluating the degree of a risk that the attack step poses. In the present disclosure, the attack step and the risk diagnosis evaluation are output from the output means 13 while being associated with each other. In this way, the present disclosure can present an objective index to a user when evaluating a risk.

Figure 2:
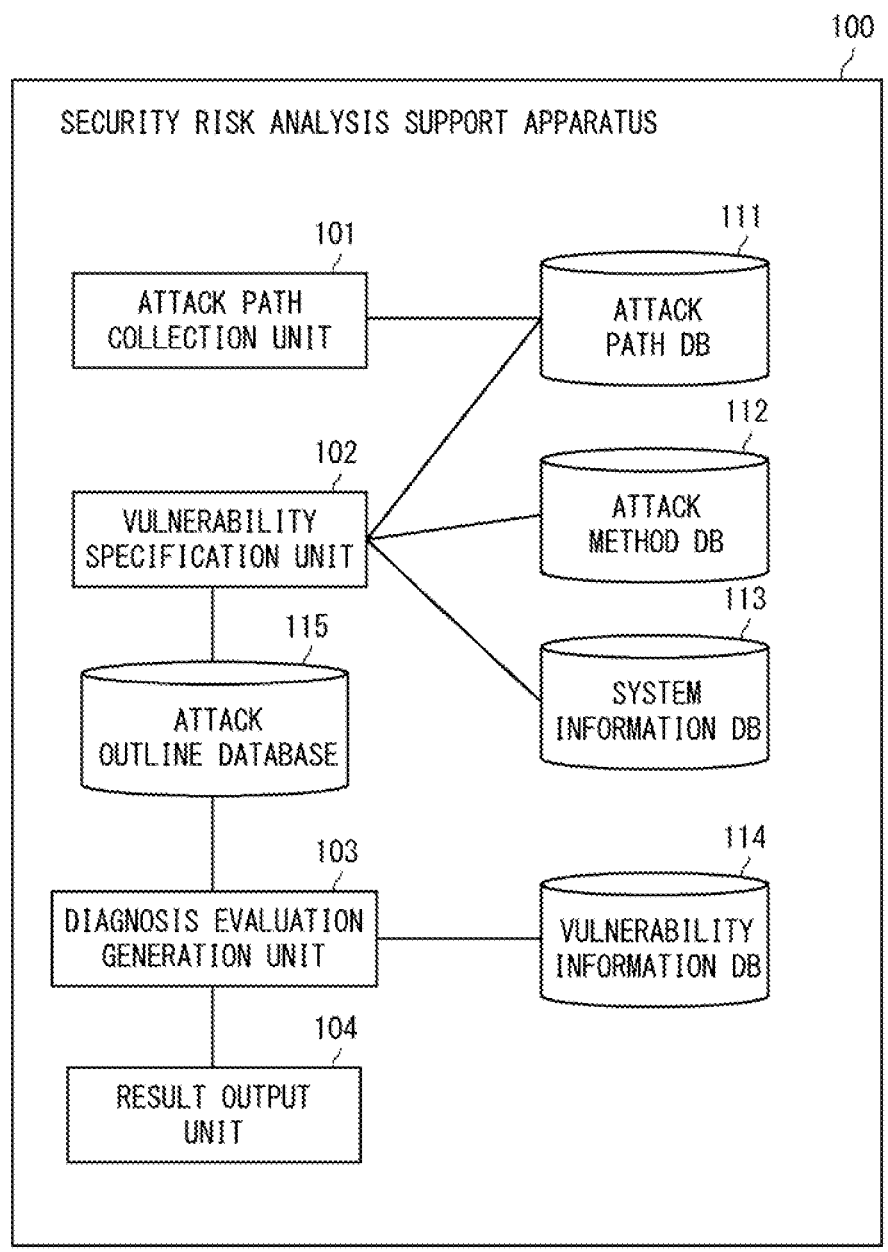
FIG. 2 is a block diagram showing a security risk analysis support apparatus according to a first example embodiment of the present disclosure.

An example embodiment according to the present disclosure will be described hereinafter in detail with reference to the drawings. FIG. 2 shows a security risk analysis support apparatus according to a first example embodiment of the present disclosure. The security risk analysis support apparatus 100 includes an attack path collection unit 101, a vulnerability specification unit 102, a diagnosis evaluation generation unit 103, a result output unit 104, an attack path DB 111, an attack method DB 112, a system information DB 113, a vulnerability information DB 114, and an attack outline DB 115.

Note that each of the attack path DB 111, the attack method DB 112, the system information DB 113, the vulnerability information DB 114, and the attack outline DB 115 does not need to be a part of the security risk analysis support apparatus 100, as long as it can be accessed by the security risk analysis support apparatus 100. For example, at least a part of these databases may be located in a cloud, and the security risk analysis support apparatus 100 may access the database located in the cloud through a network.

The attack path collection unit 101 collects attack paths of attacks against the system to be analyzed. The attack path indicates a path from an entry point included in the system to an attack target. The attack path includes an attack source, an attack destination, and an attack method. The attack path collection unit 101 collects attack paths that are generated by using, for example, an attack path generator. Alternatively, the attack path collection unit 101 may collect manually generated attack paths. The attack path collection unit 101 stores the collected attack paths in the attack path DB 111. The attack paths stored in the attack path DB 111 correspond to the attack path information 21 in FIG. 1.

Figures 3, 4:
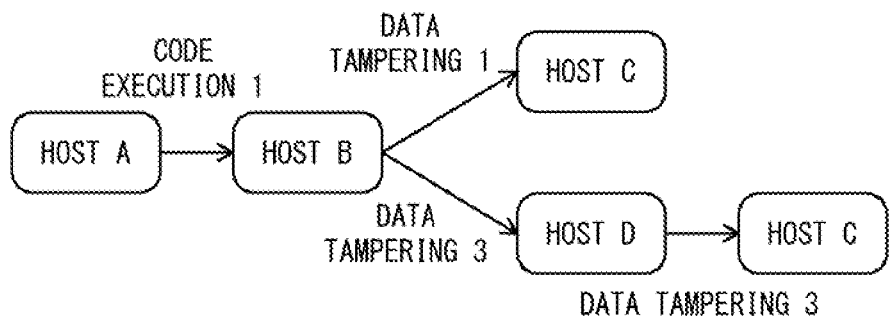
FIG. 3 shows an example of an attack path.
FIG. 4 shows an example of a table stored in an attack method DB.

FIG. 3 shows an example of an attack path. This attack path represents a path of an attack in which a host A is used as the entry point and a host C is the attack target. Each arrow on the attack path indicates an attack source and an attack destination. Further, a symbol added to each arrow indicates an identifier of an attack method used for the attack from the attack source on the attack destination. For example, FIG. 3 shows that an attack method "Code Execution 1" is used for the attack in which the host A is the attack source and the host B is the attack destination. Such attack paths can be automatically generated by using information about hardware assets included in the system, software assets included therein, their connection relations, and vulnerabilities present in these assets. For each of a plurality of attacks that can be made against the system to be analyzed, an attack path(s) corresponding to the attack is stored in the attack path DB 111.

Note that, in the following description, in general, examples in which the assets in the attack source and the attack destination are apparatuses such as servers and client terminals will be described. In the following description, apparatuses such as servers and client terminals are also referred to as "hosts". The attack source and the attack destination are not limited to the hosts, but may be, for example, network apparatuses such as firewall devices.

The attack method DB 112 is a database in which vulnerabilities and attack methods are classified so as to indicate which vulnerabilities can be applied to (i.e., exploited for) which attack methods. In the attack method DB 112, attack methods and vulnerabilities that can be exploited in the attack methods are stored while being associated with each other. For example, in the attack method DB 112, a table in which identifiers of attack method are associated with identifiers of vulnerabilities is stored. For the identifiers of vulnerabilities, for example, CVEs (Common Vulnerabilities and Exposures) can be used.

FIG. 4 shows an example of the table stored in the attack method DB 112.

In the attack method DB 112, for example, an attack method "Code Execution 1", and vulnerabilities "CVE-XXXX-0111", "CVE-XXXX-0112", "CVE-XXXX-0150" and "CVE-XXXX-0200" are stored, and these vulnerabilities are associated with the attack method . Further, in the attack method DB 112, an attack method "Data Tampering 1" and a vulnerability "CVE-XXXX-0111" and the like are stored while being associated with each other. In this case, by referring to the attack method DB 112, it can be known that the vulnerabilities "CVE-XXXX-0111", "CVE-XXXX-0112", "CVE-XXXX-0150", and "CVE-XXXX-0200", and the like can be exploited in the attack method "Code Execution 1". Further, it can be known that the vulnerability "CVE-XXXX-0-111" can be exploited in the attack method "Data Tampering 1".

In the system information DB 113, hosts included in the system to be analyzed and vulnerabilities present in the hosts are stored while being associated with each other. In the system information DB 113, for each of the hosts and the like included in the system, identifiers of vulnerabilities present in software of the host are stored. The system information DB 113 can be constructed, for example, by using a vulnerability scanner. Alternatively, the system information DB 113 can be constructed based on the information about the system to be analyzed by referring to a vulnerability database such as the National Vulnerability Database (NVD).

The vulnerability specification unit 102 refers to the attack path DB 111, the attack method DB 112, and the system information DB 113, and thereby specifies, for each of the attack steps included in the attack path, vulnerabilities that can be exploited by an attack on the attack destination in the attack step. The vulnerability specification unit 102 specifies, for each of the attack paths stored in the attack path DB 111, vulnerabilities that can be exploited by an attack on the attack destination in each of the attack steps. The vulnerability specification unit 102 corresponds to the vulnerability specification means 11 in FIG. 1.

The vulnerability specification unit 102 acquires, for example, an attack source, an attack destination, and an attack method from the attack path DB 111. The vulnerability specification unit 102 acquires, from the attack method DB 112, vulnerabilities stored in association with the acquired attack method. The vulnerability specification unit 102 refers to the system information DB 113 and thereby specifies, among the vulnerabilities acquired from the attack method DB 112, vulnerabilities that are present in the host and the like at the attack destination as vulnerabilities that can be exploited by the attack on the attack destination in the attack step. The vulnerability specification unit 102 stores the attack source, the attack destination, and the attack method of the attack step, and the identifiers of the specified vulnerabilities in the attack outline DB 115.

FIG. 5 shows an example of the information stored in the attack outline DB 115. The vulnerability specification unit 102 stores the attack source, the attack destination, and the attack method of each of the attack steps acquired from the attack path DB 111 in columns "Attack Source", "Attack Destination", and "Attack Method" in the attack outline DB 115. The vulnerability specification unit 102 stores the vulnerabilities specified as vulnerabilities that can be exploited by the attack on the attack destination in a column "Vulnerability" in the attack outline DB 115.

For example, for the attack step in which an attack from the host A on the host B is made by using the vulnerability "Code Execution 1", the vulnerability specification unit 102 refers to the attack method DB 112 (see FIG. 4) and thereby acquires vulnerabilities "CVE-XXXX-0111", "CVE-XXXX-0112", "CVE-XXXX-0150" and "CVE-XXXX-0200" stored in association with the attack method "Code Execution 1". After that, the vulnerability specification unit 102 refers to the system information DB 113 and thereby examines whether or not the host B has the vulnerabilities "CVE-XXXX-0111", "CVE-XXXX-0112", "CVE-XXXX-0150" and "CVE-XXXX-0200". When the host B has, for example, the vulnerabilities "CVE-XXXX-0111" and "CVE-XXXX-0112", the vulnerability specification unit 102 specifies the vulnerabilities "CVE-XXXX-0111" and "CVE-XXXX-0112" as vulnerabilities that can be exploited by the attack on the attack destination in the attack step.

In the above-described case, the vulnerability specification unit 102 stores the specified vulnerabilities "CVE-XXXX-0111" and "CVE-XXXX-0112" in the attack outline DB 115 while associating them with the attack source "Host A", the attack destination "Host B", and the attack method "Code Execution 1". Here, it is assumed that the host B has only the vulnerability "CVE-XXXX-0111" among the vulnerabilities "CVE-XXXX-0111", "CVE-XXXX-0112", "CVE-XXXX-0150" and "CVE-XXXX-0200". In that case, the vulnerability specification unit 102 stores the vulnerability "CVE-XXXX-0111" in the attack outline DB 115 while association it with the attack source "Host A", the attack destination "Host B", and the attack method "Code Execution 1".

The vulnerability information DB 114 is a database in which information about vulnerabilities is stored. In the vulnerability information DB 114, vulnerabilities (their identifiers) in software and presence/absence of exploit codes for the vulnerabilities are stored and associated with each other. The exploit code may be a code for checking the presence of a vulnerability, provided by a vendor, an attack module included in an intrusion detection tool, or information indicating whether or not the attack method is open to the public. In the vulnerability information DB 114, information as to whether or not a user is involved in (i.e., is related to) the vulnerability, and whether or not the software having the vulnerability is software installed by default may also be stored.

The diagnosis evaluation generation unit 103 refers to the vulnerability information DB 114 and thereby examines, for each of the vulnerabilities stored in the attack outline DB 115, whether or not there is an exploit code for the vulnerability. The diagnosis evaluation generation unit 103 generates, for each of the attack steps, the number of vulnerabilities exploited in the attack step and the presence/absence of exploit codes therefor as a risk diagnosis evaluation. For example, for a given attack step, when the number of vulnerabilities exploited in the attack step is three and there are exploit codes for two of the three vulnerabilities, the diagnosis evaluation generation unit 103 generates a risk diagnosis evaluation indicating that the number of vulnerabilities is "3" and the exploit code is "2". The diagnosis evaluation generation unit 103 corresponds to the diagnosis evaluation generation means 12 in FIG. 1.

The result output unit 104 outputs an attack step and a risk diagnosis evaluation generated for that attack step while associating them with each other. For example, the result output unit 104 outputs (i.e., displays) the attack source, the attack destination, and the attack method of the attack step, and the risk diagnosis evaluation side by side on a display screen of a display apparatus or the like. By referring to the display screen, a user can know, for each attack step, the number of vulnerabilities exploitable in the attack step, the presence/absence of exploit codes therefor, and the like. The user can determine, for each attack step, a threat level indicating the likelihood of an attack according to the number of exploitable vulnerabilities and the presence or absence of exploit codes therefor. The result output unit 104 corresponds to the output means 13 in FIG. 1.

Figure 6:
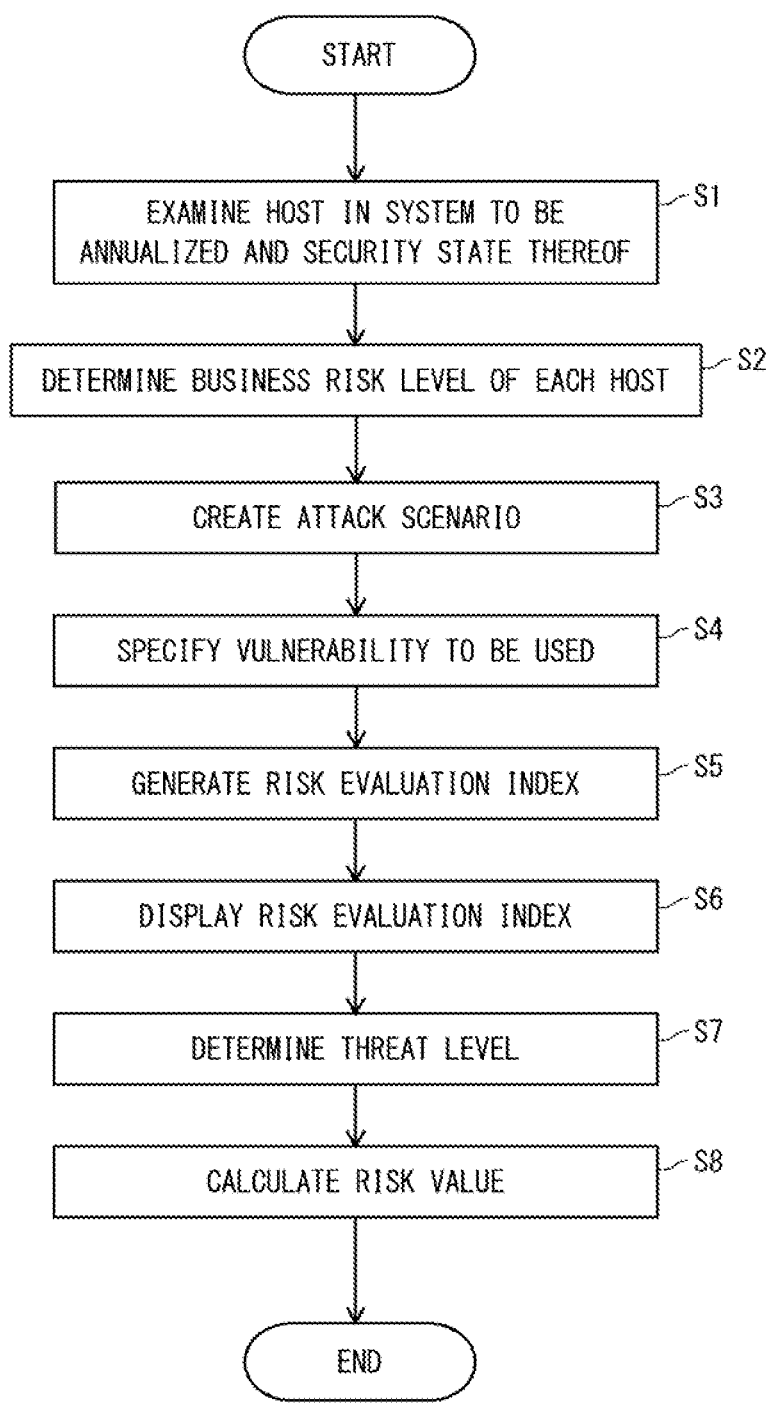
FIG. 6 is a flowchart showing a procedure for a security risk analysis.

A procedure for a security risk analysis, including an operational procedure (a security risk analysis support method) performed by the security risk analysis support apparatus 10 according to this example embodiment, will be described hereinafter. FIG. 6 shows a procedure for a security risk analysis. A user examines hosts included in a system to be analyzed and the security state of each of the hosts (Step S1). The user determines a business risk level of each host (Step S2). In the step S2, the user determines the business risk level of each host, for example, according to the guidelines shown in Non-patent Literature 1.

The user creates attack paths in the system to be analyzed (Step S3). In a step S3, the user may manually create attack paths based on, for example, information about the system and information about vulnerabilities present in each of the hosts. Alternatively, the user may create attack paths by using an attack path generator that automatically generates attack paths based on the information about the system and the information about vulnerabilities present in each of the hosts. The attack path collection unit 101 collects the attack paths generated in the step S3 and stores the collected attack paths in the attack path DB 111.

The vulnerability specification unit 102 refers to the attack path DB 111, the attack method DB 112, and the system information DB 113, and thereby specifies vulnerabilities exploitable by an attack on the attack destination in each attack step (Step S4). In a step S4, the vulnerability specification unit 102 acquires the attack source, the attack destination, and the attack method from the attack path DB 111. The vulnerability specification unit 102 acquires vulnerabilities stored in association with the acquired attack method from the attack method DB 112. The vulnerability specification unit 102 refers to the system information DB 113 and thereby specifies, among the vulnerabilities acquired from the attack method DB 112, vulnerabilities present in the host and the like at the attack destination as vulnerabilities that can be exploited by the attack on the attack destination in the attack step. The vulnerability specification unit 102 stores identifiers of the specified vulnerabilities in the attack outline DB 115.

The diagnosis evaluation generation unit 103 refers to the attack outline DB 115 and the vulnerability information DB 114, and thereby generates, for each attack step, a diagnosis evaluation including the number of exploitable vulnerabilities and the presence/absence of exploit codes therefor (Step S5). The result output unit 104 outputs the attack step and the risk diagnosis evaluation while associating them with each other (Step S6). The user determines a threat level of each attack step by referring to the displayed risk diagnosis evaluations (Step S7). The determination of a threat level may be automatically made based on the number of exploitable vulnerabilities and the presence/absence of exploit codes therefor. For example, a threat level determination unit (not shown) may be used, and the threat level determination unit may determine that the threat level of an attack step in which a vulnerability for which there is exploit code can be exploited is a level 3. Further, when there are ten vulnerabilities each of which has no exploit code but is exploitable by an attack, the threat level determination unit may determine that the threat level of the attack step is a level 2. In all cases other than the above-described cases, the threat level determination unit may determine the threat level of the attack step is 1.

The user calculates a risk value based on the threat level determined in the step S7, the business risk level determined in the step S2, and the like (Step S8). For the calculation of the risk value, for example, the calculation method disclosed in Non-patent Literature 1 may be used. The calculation of the risk value may be performed by the user, or may be automatically performed by an apparatus that calculates a risk value.

FIG. 7 shows an example of displayed risk diagnosis evaluations. In this display example, an analysis sheet which is obtained by adding a column for displaying risk diagnosis evaluations in a business impact-based risk analysis sheet disclosed in Non-patent Literature 1 is used. The result output unit 104 describes (i.e., displays) details of the risk diagnosis evaluations on such an analysis sheet. FIG. 7 includes attack steps in each of which: the entry point is a "PC (Personal Computer)"; the attack target is a "Host A"; and the final attack is a "Denial of Service (DoS) attack" (see Item Numbers "2" to "5"). For example, the attack step in the Item Number "2" indicates that: the attack source is the "PC"; the attack destination is the "Host A"; and the attack method is "Data Tampering 2". Further, the attack step in the Item Number "3" indicates that: the attack source is the "Host A"; the attack destination is the "Host A"; and the attack method is a "Code Execution 2".

Regarding the attack step in the Item Number "2", it is shown, in the risk analysis sheet, that the number of vulnerabilities exploitable in the attack step is "9", and among them, the number of vulnerabilities for which there are exploit codes is "2". Since a vulnerability for which there is an exploit code can be exploited in this attack step, the user determines the threat level to be "3" and records the determined threat level in the risk analysis sheet. Meanwhile, for the attack step in the Item Number "3", the number of vulnerabilities exploitable in this attack step is "0". In this case, since no vulnerability is exploitable in this attack step, the user determines the threat level to be "1" and records the determined threat level in the risk analysis sheet. In this way, the user can determine a threat level based on an objective index included (i.e., shown) in the risk analysis sheet.

In this example embodiment, the vulnerability specification unit 102 specifies vulnerabilities exploitable by an attack on the attack destination in each attack step. The diagnosis evaluation generation unit 103 generates, for each attack step, risk diagnosis evaluations including the number of vulnerabilities exploitable by the attack on the attack destination and the presence/absence of exploit codes therefor. The result output unit 104 outputs an attack step and a risk diagnosis evaluation generated for that attack step while associating them with each other. By doing so, the security risk analysis support apparatus 100 can present, for each attack step, an objective index that is used when the easiness of an attack or the like is evaluated in the attack step to the user. The user can easily determine a threat level and the like by using the risk diagnosis evaluations.

Note that although an example in which a column in which risk diagnosis evaluations are shown is added in a business impact-based risk analysis sheet is described in this example embodiment, the present disclosure is not limited to such examples. For example, the security risk analysis support apparatus 100 may add a column in which risk diagnosis evaluations are shown in the asset-based risk analysis sheet disclosed in Non-patent Literature 1.

Figure 8:
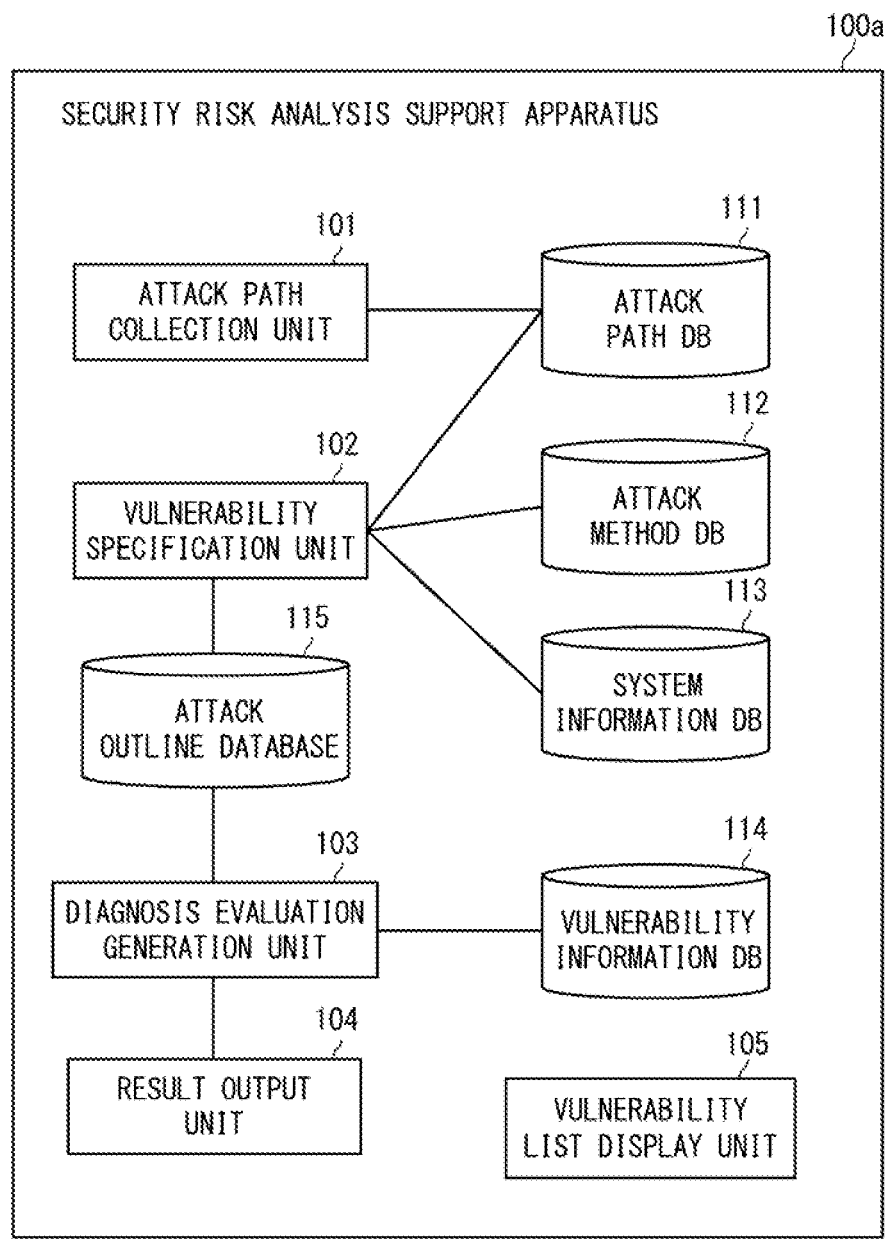
FIG. 8 is a block diagram showing a security risk analysis support apparatus according to a second example embodiment of the present disclosure.

Next, a second example embodiment according to the present disclosure will be described. FIG. 8 shows a security risk analysis support apparatus according to the second example embodiment of the present disclosure. The security risk analysis support apparatus 100a according to this example embodiment includes a vulnerability list display unit 105 in addition to the components of the security risk analysis support apparatus 100 shown in FIG. 2. The vulnerability list display unit (vulnerability list display means) 105 displays a list of vulnerabilities exploitable in the attack step. The other features may be similar to those in the first example embodiment.

In this example embodiment, the result output unit 104 displays, for example, a series of attack steps and risk diagnosis evaluations in each of the attack steps on a screen. A user can select one of the displayed attack steps. When an attack step is selected, the vulnerability list display unit 105 refers to the attack outline DB 115 and thereby specifies vulnerabilities exploitable in the selected attack step (e.g., exploitable by its attack method). The vulnerability list display unit 105 displays a list of specified vulnerabilities on a display screen. The list of vulnerabilities includes, for example, an embedded link to individual detailed information for each vulnerability. The user can select a vulnerability from the list and display the individual detailed information of the selected vulnerability on the display screen.

FIG. 9 shows an example of the list of vulnerabilities. The list of vulnerabilities shown in FIG. 9 corresponds to a list of vulnerabilities exploitable in the attack step of the Item Number "2" included (i.e., shown) in the risk analysis sheet shown in FIG. 7. In this example, it is assumed that the vulnerabilities that can be exploitable by the attack on the attack destination "Host A" using the attack method "Data Tampering 2" include vulnerabilities "CVE-XXXX-0111", "CVE-XXXX-0222" and "CVE-XXXX-0333". When the user selects the attack step of the Item Number "2" in the risk analysis sheet shown in FIG. 7, the vulnerability list display unit 105 displays a list of nine vulnerabilities in total, including the vulnerabilities "CVE-XXXX-0111", "CVE-XXXX-0222" and "CVE-XXXX-0333".

The vulnerability list display unit 105 displays a link to individual detailed information for each of the vulnerabilities. When a plurality of pieces of individual detailed information are provided for one vulnerability, the vulnerability list display unit 105 may display a plurality of links for the one vulnerability. The user selects one of the displayed links that corresponds to, for example, the vulnerability "CVE-XXXX-0222". When the user selects the link, the vulnerability list display unit 105 displays the linked site by using a browser or the like, and presents the individual detailed information of the vulnerability CVE-XXXX-0222 to the user. The user can think out (i.e., work out) countermeasures against the attack step by referring to the contents of the individual detailed information.

In this example embodiment, the vulnerability list display unit 105 displays a list of vulnerabilities exploitable by the attack step. By referring to the displayed list, the user can know which vulnerabilities are exploitable in the attack step. Further, the vulnerability list display unit 105 also displays, when available, a link to individual detailed information for each of the vulnerabilities. The user can know detailed information of a vulnerability by selecting a link therefor. By doing so, the user can easily access the detailed information of the vulnerability exploitable in the attack step.

Figure 10:
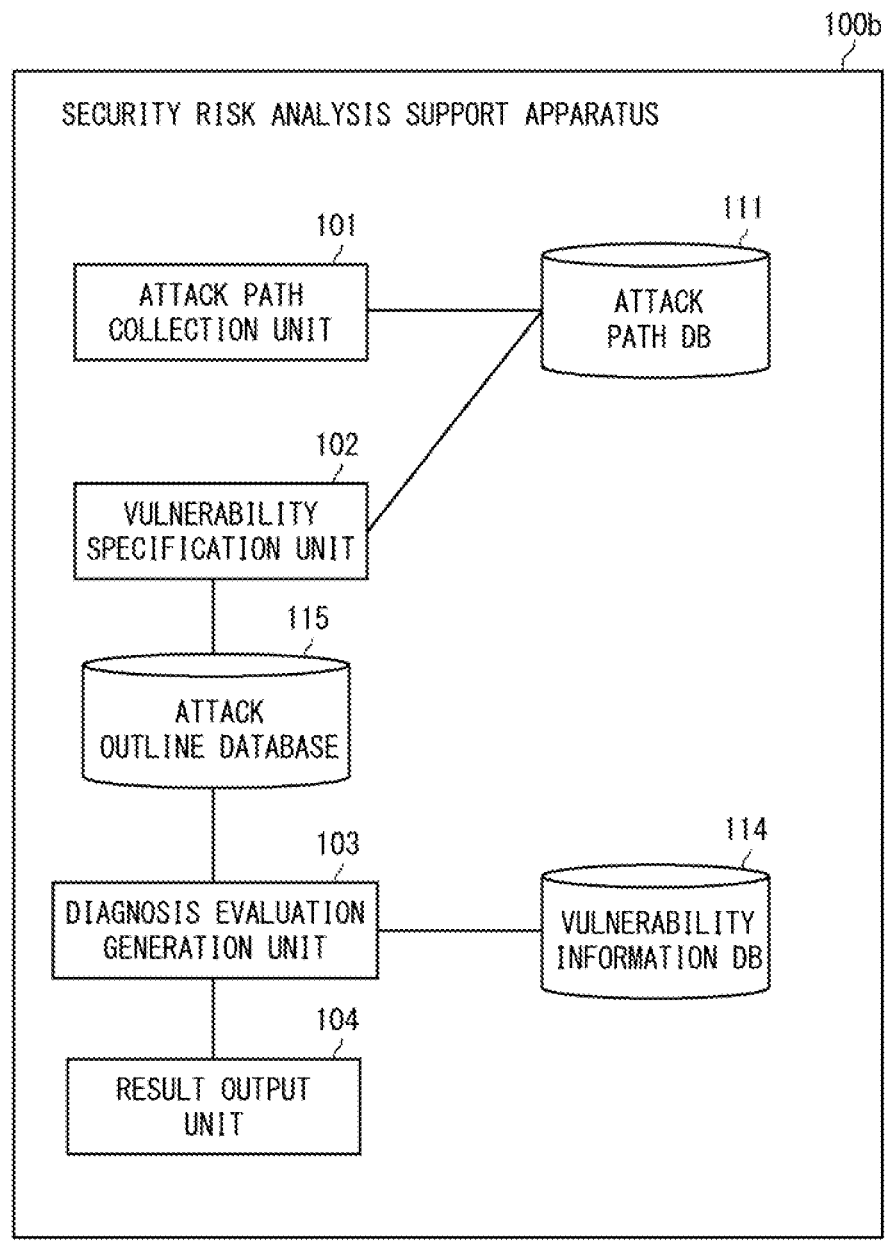
FIG. 10 is a block diagram showing a security risk analysis support apparatus according to a third example embodiment of the present disclosure.

Next, a third example embodiment according to the present disclosure will be described. FIG. 10 shows a security risk analysis support apparatus according to the third example embodiment of the present disclosure. The security risk analysis support apparatus 100b according to this example embodiment differs from the security risk analysis support apparatus 100 according to the first example embodiment shown in FIG. 2 because it does not include the attack method DB 112 and the system information DB 113. Alternatively, the security risk analysis support apparatus according to this example embodiment differs from the security risk analysis support apparatus 100a according to the second example embodiment shown in FIG. 8 because it does not include the attack method DB 112 and system information DB 113. The other configurations may be similar to those in the first or second example embodiment.

Figures 11, 12:
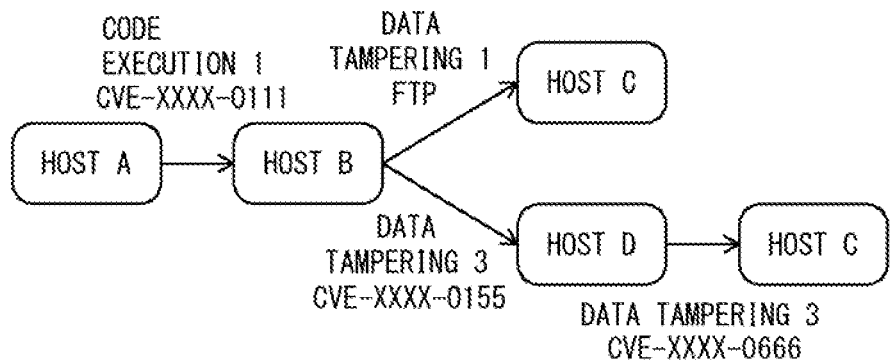
FIG. 11 shows an example of an attack graph.
FIG. 12 shows a specific example of risk diagnosis evaluations.

In this example embodiment, the attack path collection unit 101 collects, in addition to the attack source, the attack destination, and the attack method, attack paths (attack graphs) that include vulnerabilities exploitable by the attack method. FIG. 11 shows an example of one of attack graphs to be collected. This attack graph shows a path of an attack in which a host A is used as an entry point and a host C is an attack target. Each arrow on the attack graph indicates an attack source and an attack destination. Further, symbols added to each arrow indicate an identifier of an attack method exploitable by an attack from the attack source on the attack destination and an identifier of a vulnerability exploitable by this attack method, respectively.

For example, FIG. 11 shows that an attack method "Code Execution 1" is used by an attack in which a host A is the attack source and a host B is the attack destination, and the attack method "Code Execution 1" uses a vulnerability "CVE-XXXX-0111". Further, FIG. 11 shows that an attack method "Data Tampering 1" is used by an attack in which the host B is the attack source and a host C is the attack destination, and the attack method "Data Tampering 1" uses a vulnerability in an FTP (File Transfer Protocol). Note that the vulnerability in the FTP is a vulnerability related to the protocol.

The above-described attack graph can be automatically generated by using information about hardware assets included in the system, software assets included therein, their connection relations, and vulnerabilities present in these assets. The attack path collection unit 101 stores the collected attack graphs in the attack path DB 111.

In this example embodiment, the vulnerability specification unit 102 specifies vulnerabilities exploitable in each attack step from the attack graph. The vulnerability information DB 114 stores, in addition to the information about vulnerabilities in the software described in the first example embodiment, information about vulnerabilities in the protocol. The information about vulnerabilities in the protocol includes at least one of whether encryption is used, whether logging-in is required, whether a file is transferred, or whether account information is stolen.

The diagnosis evaluation generation unit 103 may generate risk diagnosis evaluations for the vulnerabilities in the protocol in addition to those for the vulnerabilities in the software. FIG. 12 shows a specific example of risk diagnosis evaluations. The risk diagnosis evaluations related to the software include columns "Number of Vulnerabilities" and "Exploit code" as in the case of the example shown in FIG. 7. The risk diagnosis evaluations related to the protocol include columns "Encryption", "Login", "File Transfer", and "Account Stealing".

For example, when information indicating that the encryption is "Yes" for a vulnerability in the protocol is stored in the vulnerability information DB 114, the diagnosis evaluation generation unit 103 writes "Yes" in a cell in the column "Encryption". When information indicating that the encryption is "No" is stored in the vulnerability information DB 114, the diagnosis evaluation generation unit 103 writes "No" in a cell in the column "Encryption". Similarly, the diagnosis evaluation generation unit 103 writes "Yes" or "No" in a cell of each of the columns "Login", "File Transfer", and "Account Stealing" according to the information stored in the vulnerability information DB 114. The result output unit 104 may display the results of risk analyses for the software and the protocol while associating them with the attack step.

In this example embodiment, an attack graph including, in addition to the attack source, the attack destination, and the attack method, information identifying vulnerabilities exploitable by the attack method is used. By using the attack graph, the vulnerability specification unit 102 can specify vulnerabilities exploitable in each attack step without referring to the attack method DB and the system information DB. Further, when a vulnerability in the protocol is used by an attack on the attack destination, the diagnosis evaluation generation unit 103 generates risk diagnosis evaluations for the protocol. A user can refer to the risk diagnosis evaluations for the protocol and thereby determines a threat level and the like of the attack step in which a vulnerability in the protocol is used. The other advantageous effects are similar to those obtained in the first or second example embodiment.

Note that although an example in which the risk diagnosis evaluations include, in regard to the software, the number of vulnerabilities exploitable in the attack step and the presence/absence of exploit codes therefor has been described in each of the above-described example embodiments, the risk diagnosis evaluations are not limited to those described above. For example, the risk diagnosis evaluations may include at least one of information as to whether a user is involved (i.e., is related) or the number of appearances of attacks using the same attack method against the same target.

FIG. 13 shows a specific example of risk diagnosis evaluations according to a modified example. In this example, the risk diagnosis evaluations includes columns "User Involvement" and "Number of Appearances" in addition to the columns "Number of Vulnerabilities" and "Exploit code". The vulnerability information DB 114 stores, for each vulnerability, information indicating whether or not a user is involved in (i.e., is related to) the vulnerability. For example, when information indicating that a user is involved in the vulnerability is stored in the vulnerability information DB 114, the diagnosis evaluation generation unit 103 writes "Yes" in a cell of the column "User Involvement". For example, when information indicating that a user is not involved in the vulnerability is stored in the vulnerability information DB 114, the diagnosis evaluation generation unit 103 writes "No" in a cell of the column "User Involvement".

The diagnosis evaluation generation unit 103 counts the number of appearances of a pair of an attack destination and an attack method in the attack step in the attack path stored in the attack path DB 111. The diagnosis evaluation generation unit 103 records the number of appearances of a pair of an attack destination and an attack method in a cell of a column "Number of Appearances of Scenarios" in the risk diagnosis evaluations. When security measures are taken for an attack step which appears in lager numbers in scenarios, it means that the security measures have been taken for a larger number of attack steps. Therefore, the number of appearances in scenarios can be used as an index based on which a user determines for which attack step(s) he/she should preferentially take security measures under the constraints of the time, the cost, and the like.

Figure 14:
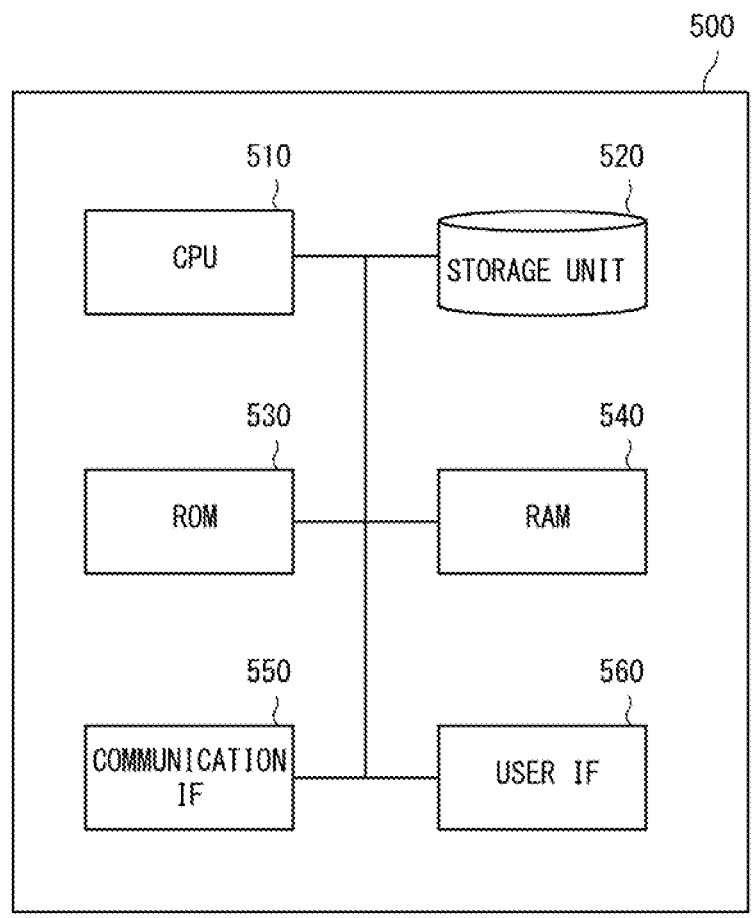
FIG. 14 is a block diagram showing an example of a configuration of a computer apparatus.

Next, a physical configuration of a security risk analysis support apparatus will be described. FIG. 14 shows an example of a configuration of a computer apparatus that can be used as the security risk analysis support apparatus 100. A computer apparatus 500 includes a control unit (CPU: Central Processing Unit) 510, a storage unit 520, a ROM (Read Only Memory) 530, a RAM (Random Access Memory) 540, a communication interface (IF: Interface) 550, and a user interface 560.

The communication interface 550 is an interface for connecting the computer apparatus 500 to a communication network through wired communication means or wireless communication means or the like. The user interface 560 includes, for example, a display unit such as a display device. Further, the user interface 560 includes an input unit such as a keyboard, a mouse, and a touch panel.

The storage unit 520 is an auxiliary storage device that can hold various types of data. The storage unit 520 does not necessarily have to be a part of the computer apparatus 500, but may be an external storage device, or a cloud storage connected to the computer apparatus 500 through a network. The storage unit 520 can be used as, for example, at least one of the attack path DB 111, the attack method DB 112, the system information DB 113, the vulnerability information DB 114, or the attack outline DB 115 shown in FIG. 2.

The ROM 530 is a non-volatile storage device. For example, a semiconductor storage device such as a flash memory having a relatively small capacity can be used for the ROM 530. A program(s) that is executed by the CPU 510 may be stored in the storage unit 520 or the ROM 530. The storage unit 520 or the ROM 530 stores, for example, various programs for implementing the function of each unit in the security risk analysis support apparatus 100.

The aforementioned program can be stored and provided to the computer apparatus 500 by using any type of non-transitory computer readable media. Non-transitory computer readable media include any type of tangible storage media. Examples of non-transitory computer readable media include magnetic storage media such as floppy disks, magnetic tapes, and hard disk drives, optical magnetic storage media such as magneto-optical disks, optical disk media such as CD (Compact Disc) and DVD (Digital Versatile Disk), and semiconductor memories such as mask ROM, PROM (Programmable ROM), EPROM (Erasable PROM), flash ROM, and RAM. Further, the program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a radio communication line.

The RAM 540 is a volatile storage device. As the RAM 540, various types of semiconductor memory apparatuses such as a DRAM (Dynamic Random Access Memory) or an SRAM (Static Random Access Memory) can be used. The RAM 540 can be used as an internal buffer for temporarily storing data and the like. The CPU 510 expands (i.e., loads) a program stored in the storage unit 520 or the ROM 530 in the RAM 540, and executes the expanded (i.e., loaded) program. The function of each unit in the security risk analysis support apparatus 100 can be implemented by having the CPU 510 execute a program. The CPU 510 may include an internal buffer in which data and the like can be temporarily stored.

Although example embodiments according to the present disclosure have been described above in detail, the present disclosure is not limited to the above-described example embodiments, and the present disclosure also includes those that are obtained by making changes or modifications to the above-described example embodiments without departing from the spirit of the present disclosure.

For example, the whole or part of the example embodiments disclosed above can be described as, but not limited to, the following supplementary notes.

[Supplementary Note 1]

A security risk analysis support apparatus comprising:

vulnerability specification means for referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target;

diagnosis evaluation generation means for referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and output means for outputting the attack step and the risk diagnosis evaluation while associating them with each other.

[Supplementary Note 2]

The security risk analysis support apparatus described in Supplementary note 1, wherein the output means writes a content of the risk diagnosis evaluation in at least one of an analysis sheet that is obtained by adding a column in which the risk diagnosis evaluation is written in a business impact-based risk analysis sheet or an analysis sheet that is obtained by adding a column in which the risk diagnosis evaluation is written in an asset-based risk analysis sheet.

[Supplementary Note 3]

The security risk analysis support apparatus described in Supplementary note 1 or 2, wherein the diagnosis evaluation generation means includes, in the risk diagnosis evaluation, the number of vulnerabilities for which there are exploit codes among the specified vulnerabilities.

[Supplementary Note 4]

The security risk analysis support apparatus described in any one of Supplementary notes 1 to 3, wherein the vulnerability specification means stores the attack step and the specified vulnerability in an attack outline database while associating them with each other.

[Supplementary Note 5]

The security risk analysis support apparatus described in any one of Supplementary notes 1 to 4, wherein in the vulnerability information database, the vulnerability and information indicating whether or not a user is involved are further stored and associated with each other, and the diagnosis evaluation generation means acquires, from the vulnerability information database, the information indicating whether or not the user is involved, stored in association with the specified vulnerability, and generates the risk diagnosis evaluation further including the acquired information indicating whether or not the user is involved.

[Supplementary Note 6]

The security risk analysis support apparatus described in any one of Supplementary notes 1 to 5, wherein the diagnosis evaluation generation means counts the number of appearances of attack destinations and attack methods in the attack step in the attack path information, and generates the risk diagnosis evaluation further including the number of appearances of the attack destinations and the attack methods.

[Supplementary Note 7]

The security risk analysis support apparatus described in any one of Supplementary notes 1 to 6, further comprising vulnerability list display means for displaying a list of vulnerabilities specified by the vulnerability specification means.

[Supplementary Note 8]

The security risk analysis support apparatus described in Supplementary note 7, wherein when a user selects an attack step, the vulnerability list display means displays a list of vulnerabilities that are specified for the selected attack step by the vulnerability specification means.

[Supplementary Note 9]

The security risk analysis support apparatus described in Supplementary note 7 or 8, wherein the vulnerability list display means displays a link to detailed information of the vulnerability in the list of vulnerabilities.

[Supplementary Note 10]

The security risk analysis support apparatus described in any one of Supplementary notes 1 to 9, wherein the vulnerability specification means further refers to an attack method database in which the attack methods and vulnerabilities that can be used by the attack methods are stored and associated with each other, refers to a system information database in which vulnerabilities present in assets included in the system are stored, and thereby specifies a vulnerability exploitable by an attack on the attack destination in the attack step.

[Supplementary Note 11]

The security risk analysis support apparatus described in any one of Supplementary notes 1 to 9, wherein the attack path information further includes a vulnerability exploitable by an attack from the attack source on the attack destination, and the vulnerability specification means acquires, from the attack path information, the vulnerability exploitable by the attack on the attack destination in the attack step.

[Supplementary Note 12]

The security risk analysis support apparatus described in any one of Supplementary notes 1 to 11, wherein the vulnerability includes a vulnerability in software and a vulnerability in a protocol, in the vulnerability information database, presence/absence of an exploit code for the vulnerability in the software is stored, and when the specified vulnerability is the vulnerability in the software, the diagnosis evaluation generation means generates the risk diagnosis evaluation including the number of specified vulnerabilities and the presence/absence of the exploit code therefor.

[Supplementary Note 13]

The security risk analysis support apparatus described in Supplementary note 12, wherein in the vulnerability information database, the vulnerability in the protocol is stored, and at least one of whether encryption is used, whether logging-in is performed, whether a file is transferred, or whether account information is stolen is also stored and associated with the vulnerability in the protocol, the security risk analysis support apparatus further comprises diagnosis evaluation generation means for referring to a vulnerability information database in which vulnerabilities and presence/absence of exploit codes for the vulnerabilities are stored and associated with each other, and thereby examining whether or not there is an exploit code for the specified vulnerability and generating, for the attack step, the risk diagnosis evaluation including the number of specified vulnerabilities and the presence/absence of the exploit code therefor, and when the specified vulnerability is the vulnerability in the protocol, the diagnosis evaluation generation means generates the risk diagnosis evaluation including at least one of whether encryption is used, whether logging-in is performed, whether a file is transferred, or whether account information is stolen.

[Supplementary Note 14]

A security risk analysis support method comprising:

referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target;

referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and outputting the attack step and the risk diagnosis evaluation while associating them with each other.

[Supplementary Note 15]

A non-transitory computer readable medium storing a program for causing a computer to perform processes comprising:

referring to attack path information including information about an attack path including at least one attack step including an attack source, an attack destination, and an attack method, and thereby specifying, for the attack step, a vulnerability exploitable by an attack on the attack destination in the attack step, the attack path indicating a path from an entry point included in a system to be analyzed to an attack target;

referring to a vulnerability information database in which vulnerabilities and presence/absence of exploit codes for the vulnerabilities are stored and associated with each other, and thereby examining whether or not there is an exploit code for the specified vulnerability and generating a risk diagnosis evaluation for the attack step, the risk diagnosis evaluation including the number of specified vulnerabilities and presence/absence of the exploit code therefor; and outputting the attack step and the risk diagnosis evaluation while associating them with each other.

REFERENCE SIGNS LIST

10 SECURITY RISK ANALYSIS SUPPORT APPARATUS
11 VULNERABILITY SPECIFICATION MEANS
12 DIAGNOSIS EVALUATION GENERATION MEANS
13 OUTPUT MEANS
21 ATTACK PATH INFORMATION
22 VULNERABILITY INFORMATION DATABASE
100 SECURITY RISK ANALYSIS SUPPORT APPARATUS
101 ATTACK PATH COLLECTION UNIT
102 VULNERABILITY SPECIFICATION UNIT
103 DIAGNOSIS EVALUATION GENERATION UNIT
104 RESULT OUTPUT UNIT
105 VULNERABILITY LIST DISPLAY UNIT
111 ATTACK PATH DATABASE

112 ATTACK METHOD DATABASE
113 SYSTEM INFORMATION DATABASE
114 VULNERABILITY INFORMATION DATABASE
115 ATTACK OUTLINE DATABASE

What is claimed is:

1. A security risk analysis support apparatus comprising:
at least one memory storing instructions, and
at least one processor configured to execute the instructions to:
refer to attack path information including, for each of a plurality of possible attacks on a system to be analyzed, information about an attack path including one or more at least one attack steps each including an attack source, an attack destination, and an attack method, to specify, for each of the one or more attack steps, one or more vulnerabilities exploitable by an attack on the attack destination in the attack step, the attack path indicating a path from an entry point included in the system to an attack target;
acquire a number of the specified one or more vulnerabilities for each of the one or more attack steps;
refer to a vulnerability information database in which vulnerabilities and presence/absence of exploit codes for the vulnerabilities are stored and associated with each other, to examine whether or not there are one or more exploit codes for the specified one or more vulnerabilities and to acquire, for each of the one or more attack steps, a number of one or more vulnerabilities for which there are one or more exploit codes;
acquire, for each of the one or more attack steps, a number of appearances of a combination of the attack destination and the attack method included in the attack step in the plurality of possible attacks;
generate, for each of the one or more attack steps, a risk diagnosis evaluation including the number of the specified one or more vulnerabilities acquired for the attack step, the number of the one or more vulnerabilities acquired for the attack step, and the number of the appearances of the combination acquired for the attack step; and
output the one or more attack steps included in the attack path and the risk diagnosis evaluation generated for each of the one or more attack steps in a tabular format.

2. The security risk analysis support apparatus according to claim 1, wherein the at least one processor is further configured to execute the instructions to write content of the risk diagnosis evaluation in at least one of an analysis sheet obtained by adding a column in which the risk diagnosis evaluation is written in a business impact-based risk analysis sheet or an analysis sheet obtained by adding a column in which the risk diagnosis evaluation is written in an asset-based risk analysis sheet.

3. The security risk analysis support apparatus according to claim 1, wherein the at least one processor is further configured to execute the instructions to store the attack step and the specified one or more vulnerabilities in an attack outline database while associating the attack step and the specified one or more vulnerabilities with each other.

4. The security risk analysis support apparatus according to claim 1, wherein
in the vulnerability information database, each of the vulnerabilities and information indicating whether or not a user is involved are further stored and associated with each other, and
the at least one processor is further configured to execute the instructions to acquire, from the vulnerability information database, the information indicating whether or not the user is involved, stored in association with each of the specified one or more vulnerabilities, and generate the risk diagnosis evaluation to further include the acquired information indicating whether or not the user is involved.

5. The security risk analysis support apparatus according to claim 1, wherein the at least one processor is further configured to execute the instructions to display a list of the specified one or more vulnerabilities.

6. The security risk analysis support apparatus according to claim 5, wherein when a user selects the attack step, the at least one processor is further configured to execute the instructions to display a list of the one or more vulnerabilities that are specified for the selected attack step.

7. The security risk analysis support apparatus according to claim 5, wherein the at least one processor is further configured to execute the instructions to display a link to detailed information of each vulnerability in the list of the specified one or more vulnerabilities.

8. The security risk analysis support apparatus according to claim 1, wherein the at least one processor is further configured to execute the instructions to refer to an attack method database in which attack methods and vulnerabilities that can be used by the attack methods are stored and associated with each other, and refer to a system information database in which vulnerabilities present in assets included in the system are stored, to specify each of the one or more vulnerabilities exploitable by the attack on the attack destination in the attack step.

9. The security risk analysis support apparatus according to claim 1, wherein the attack path information further includes the one or more vulnerabilities exploitable by the attack of the attack source on the attack destination, and the at least one processor is further configured to execute the instructions to acquire, from the attack path information, the one or more vulnerabilities exploitable by the attack on the attack destination in the attack step.

10. The security risk analysis support apparatus according to claim 1, wherein
the vulnerabilities include a vulnerability in software and a vulnerability in a protocol,
when the specified one or more vulnerabilities include the vulnerability in the software, the at least one processor is further configured to execute the instructions to generate the risk diagnosis evaluation to include the number of specified one or more vulnerabilities that are the vulnerability in the software and the presence/absence of the exploit code therefor.

11. The security risk analysis support apparatus according to claim 10, wherein
the vulnerability information database stores, for the vulnerability in the protocol, at least one of whether encryption is used, whether login is performed, whether a file is transferred, or whether account information is stolen, in association with the vulnerability in the protocol,
when the specified one or more vulnerabilities include the vulnerability in the protocol, the at least one processor is further configured to execute the instructions to generate the risk diagnosis evaluation to include the at least one of whether encryption is used, whether login is performed, whether the file is transferred, or whether the account information is stolen.

12. A security risk analysis support method performed by a computer and comprising:
referring to attack path information including, for each of a plurality of possible attacks on a system to be analyzed, information about an attack path including one or more attack steps each including an attack source, an attack destination, and an attack method, to specify, for each of the one or more attack steps, one or more vulnerabilities exploitable by an attack on the attack destination in the attack step, the attack path indicating a path from an entry point included in the system to an attack target;

acquiring a number of the specified one or more vulnerabilities for each of the one or more attack steps;

referring to a vulnerability information database in which vulnerabilities and presence/absence of exploit codes for the vulnerabilities are stored and associated with each other, to examine whether or not there are one or more exploit codes for the specified one or more vulnerabilities and to acquire, for each of the one or more attack steps, a number of one or more vulnerabilities for which there are one or more exploit codes;

acquiring, for each of the one or more attack steps, a number of appearances of a combination of the attack destination and the attack method included in the attack step in the plurality of possible attacks;

generating, for each of the one or more attack steps, a risk diagnosis evaluation including the number of the specified one or more vulnerabilities acquired for the attack step, the number of the one or more vulnerabilities acquired for the attack step, and the number of the appearances of the combination acquired for the attack step; and outputting the one or more attack steps included in the attack path and the risk diagnosis evaluation generated for each of the one or more attack steps in a tabular format.

13. A non-transitory computer readable medium storing a program for causing a computer to perform processes comprising:

referring to attack path information including, for each of a plurality of possible attacks on a system to be analyzed, information about an attack path including one or more attack steps each including an attack source, an attack destination, and an attack method, to specify, for each of the one or more attack steps, one or more vulnerabilities exploitable by an attack on the attack destination in the attack step, the attack path indicating a path from an entry point included in the system to an attack target;

acquiring a number of the specified one or more vulnerabilities for each of the one or more attack steps;

referring to a vulnerability information database in which vulnerabilities and presence/absence of exploit codes for the vulnerabilities are stored and associated with each other, to examine whether or not there are one or more exploit codes for the specified one or more vulnerabilities and to acquire, for each of the one or more attack steps, a number of one or more vulnerabilities for which there are one or more exploit codes;

acquiring, for each of the one or more attack steps, a number of appearances of a combination of the attack destination and the attack method included in the attack step in the plurality of possible attacks;

generating, for each of the one or more attack steps, a risk diagnosis evaluation including the number of the specified one or more vulnerabilities acquired for the attack step, the number of the one or more vulnerabilities acquired for the attack step, and the number of the appearances of the combination acquired for the attack step; and outputting the one or more attack steps included in the attack path and the risk diagnosis evaluation generated for each of the one or more attack steps in a tabular format.

* * * * *